(12) United States Patent
Gonzalez Fernandez et al.

(10) Patent No.: US 8,932,427 B2
(45) Date of Patent: Jan. 13, 2015

(54) COMPACTION PROCESS OF A PIECE OF COMPOSITE MATERIALS

(75) Inventors: Gerardo Gonzalez Fernandez, Getafe (ES); Victor Sanchez Montes, Casarrubios del Monte (ES)

(73) Assignee: Airbus Operations, S.L., Madrid (ES)

( * ) Notice: Subject to any disclaimer, the term of this patent is extended or adjusted under 35 U.S.C. 154(b) by 184 days.

(21) Appl. No.: 13/493,637

(22) Filed: Jun. 11, 2012

(65) Prior Publication Data

US 2013/0153140 A1 Jun. 20, 2013

Related U.S. Application Data

(63) Continuation of application No. PCT/ES2010/070690, filed on Oct. 26, 2010.

(30) Foreign Application Priority Data

Dec. 11, 2009 (ES) .................................. 200931151

(51) Int. Cl.
*B32B 37/10* (2006.01)
*B29C 65/00* (2006.01)
*B29C 70/44* (2006.01)

(52) U.S. Cl.
CPC ....... *B32B 37/1009* (2013.01); *B29C 66/82661* (2013.01); *B29C 70/44* (2013.01)
USPC .......................................... 156/285; 156/286

(58) Field of Classification Search
CPC .. B29C 66/82661; B29C 70/44; B32B 37/10; B32B 37/1009; B32B 37/1018
USPC .................................................. 156/285, 286
See application file for complete search history.

(56) References Cited

U.S. PATENT DOCUMENTS

| | | | | |
|---|---|---|---|---|
| 4,287,015 A | * | 9/1981 | Danner, Jr. ..................... | 156/382 |
| 4,816,106 A | * | 3/1989 | Turris et al. .................... | 156/285 |
| 4,836,765 A | * | 6/1989 | Kornitzky et al. ............. | 156/285 |
| 4,851,280 A | * | 7/1989 | Gupta ............................ | 156/285 |
| 5,131,834 A | * | 7/1992 | Potter ............................ | 156/285 |
| 6,517,658 B1 | * | 2/2003 | Wageman et al. ............. | 156/286 |

(Continued)

FOREIGN PATENT DOCUMENTS

DE 10 2006 050 579 B3 3/2008
ES 2 326 542 10/2009

(Continued)

OTHER PUBLICATIONS

International Search Report mailed on Feb. 10, 2011, issued for International Patent Application No. PCT/ES2010/070690, filed on Oct. 26, 2010 (with English translation).

*Primary Examiner* — Philip Tucker
*Assistant Examiner* — John Blades
(74) *Attorney, Agent, or Firm* — Oblon, Spivak, McClelland, Maier & Neustadt, L.L.P.

(57) ABSTRACT

It comprises applying a mould release agent on a compaction tool (1), carrying out its curing and applying a layer with adhesive properties (2) on the mould release agent. It is characterized in that it also comprises extending an aerator blanket (4) along the layer (2) with dimensions larger than the adhesive layer (2), extending a membrane with resilient properties (5) on the entire surface of the tool (1) by applying vacuum to the membrane (5) for compacting the adhesive layer. This method reduces the number of stages required to perform the compaction and avoids the generation of waste materials thus reducing the cost of the process.

7 Claims, 10 Drawing Sheets

(56) References Cited

U.S. PATENT DOCUMENTS

2004/0115299 A1* 6/2004 Potter et al. .................. 156/382
2006/0108058 A1 5/2006 Chapman et al.

FOREIGN PATENT DOCUMENTS

| WO | 2005/060386 A2 | 7/2005 |
| WO | 2006/112823 A1 | 10/2006 |

* cited by examiner

COMPACTION PROCESS OF A PIECE OF COMPOSITE MATERIALS

OBJECT OF THE INVENTION

The present invention, such as it is expressed in the title of this specification, relates to a compaction process of a piece of composite materials which intends to simplify the compaction process by reducing the number of necessary stages required to perform the compaction, which also has an effect on a reduction in the cost for obtaining the product.

Generally, the invention is applicable in any process wherein the compaction of a piece of composite materials is required to perform, and more particularly in the aeronautical industry for obtaining pieces which determine the coating of many of the parts of the aircraft.

BACKGROUND OF THE INVENTION

Taking as reference the manufacturing of a coating placed at the aircraft tail. Said coating consists of a base piece constituted by a laminate named skin and by an assembly of pieces rigidizing said skin, and which are named essential pieces, such as rib fastenings, stringers, capstrips, etc.

The laminate constituting the skin is obtained by stacking several layers of composite materials, either manually or in an automatic machine. Likewise, different essential pieces are obtained: rib fastenings, stringers, capstrips, etc., which when joined together and together with the base skin form a complete coating.

Before carrying out the automatic or manual laminating, it is required to perform a compaction process of several layers of composite materials on a tool, also named cradle, in order to allow performing the correct stacking, also known as the taping or laminating, of the different layers constituting the skin. In the specification, for consistency in the terminology, the terms tool and taping are utilized. In the compaction process, a mould release agent is first applied on the skin manufacturing tool in order to avoid the skin piece from remaining attached thereto.

Then the curing of the mould release agent by applying heat is performed. The remainders of the cured mould release agent are cleaned from the tool and immediately after another layer of mould release agent is applied. Once the mould release agent is dried, a layer with adhesive properties is extended on the tool in the entire surface corresponding to the skin piece dimensions, for which the layer with adhesive properties should present at least slightly larger dimensions than said skin piece. The objective of this layer is to refill the pores that may persist on the uncovered face of the coating and thus leaving a completely smooth surface.

In order for the layer with adhesive properties to stay completely adhered to the tool, a first compaction wherein a vacuum paste is attached around the tool is carried out and next an aerator blanket formed by a separating film and an aerator fabric is extended along the same. The blanket is utilized for the vacuum to equally circulate throughout all points and must have dimensions larger than the compaction area of the skin piece.

Next, a plastic layer that is attached to the previous paste is extended, and all of that in such a way that in the plastic layer is coupled a vacuum valve which, connected to a vacuum rubber which in turn is connected to the corresponding compressor, in order to extract the air from the interior of the plastic bag wherewith the compaction process of the layer with adhesive properties previously mounted is performed.

Once the compaction has been performed for about 10 minutes, the compaction bag is lifted leaving the plastic joined to one of the tool sides and the aerator blanket is removed. Once the interior of the bag has been uncovered, all those composite material patterns that should be introduced in the preparation prior to the taping of the laminate are positioned where corresponds, due to mechanical and/or designing needs, as for example, areas that should incorporate rivets.

Next, a layer with conductive properties is mounted on the entire surface of the skin piece for providing electrical continuity to the same. This layer can present a pre-impregnated mesh-shaped configuration, in which case the protective paper incorporating said layer with conductive properties is left on the face opposite to the tool, i.e. facing upwards, and a new compaction is carried out. As the vacuum paste is already attached to the bag at one side of the tool, the aerator blanket must be extended again and the vacuum bag closed in order to next connect the vacuum valve to the compressor. The conductive layer can also present a pattern-shaped or any other geometry configuration, in which case it is positioned in the corresponding place and following the mounting specifications specified by the manufacturer and the compaction is carried out by applying the vacuum on the bag.

Once the patterns and/or the layer with conductive properties have been compacted for about 10 minutes, the compaction bag is lifted leaving the plastic joined to one of the tool sides and the aerator blanket is removed in order to then detach the protective paper from the layer with conductive properties and the cut of the same is carried out, if appropriate, according to the outline that the skin piece presents, for which the entire outline is fasten with duct tape. In certain coatings some sheets rigidizing certain areas are positioned, which are placed in those points where is needed more structural rigidity, as for example, the ribs abutting a coating piece with another one through the rib fastenings. Finally, said sheets are covered, if appropriate, with a new layer with adhesive properties with similar dimensions.

Finally, the aerator blanket is placed again and the bag is closed in order to subsequently apply vacuum and compact the last layers. Next, the taping of the skin on the tool is carried out. If the taping of the layers constituting the skin is carried out manually, the bag for compacting is removed after about 10 minutes as well as the aerator blanket, and the taping process is started. Since said process has several compactions, the steps wherein the aerator blanket is placed and the bag is closed are repeated in order to subsequently apply vacuum and compact the last layers, as well as removing the bag for compacting and the aerator blanket after about 10 minutes. If the taping process is produced in an automatic machine, the tool is kept connected to the compressor until entering into the tape winding machine whereby the piece constituting the coating skin is laminated on the layers previously compacted.

Accordingly, in the compaction process the plastic layer which together with the vacuum rubber constitutes a vacuum bag is utilized. This configuration determines that pricks or chinks may appear in the plastic causing the bag to lose the vacuum, wherewith it is required to search for the prick location in order to carry out its repairing, and in the case that multiple chinks or pricks occur, is necessary to remove the bag and place a new one.

In addition, once the described compaction process has been finished, the plastic bag is substituted when carrying out a new compaction process, in order to have a higher reliability in the process, which considerably increases the costs thereof besides generating residues from the plastic and vacuum paste utilized, which with the use deteriorates and requires its substitution, which equally determines a higher run time and costs in the compaction process. Besides the materials costs, logistic costs such as the transport of the supply staff and materials are also carried out, as well as the transport of the wasted materials for its recycling and the staff thereof, besides the environmental impact that this involves.

DESCRIPTION OF THE INVENTION

In order to solve the aforementioned drawbacks, the present invention provides a new compaction process which avoids placing the vacuum paste and using the plastic, wherefore once the layer with adhesive properties has been applied on the mould release agent, the invention avoids applying the vacuum paste, wherefore a membrane with resilient properties having high vacuum stability and maximum durability is utilized instead of a plastic bag whereby it can be reutilized almost an unlimited number of times which avoids generating waste materials.

Thus, the method of the invention presents the novelty of upon applying a layer with adhesive properties on the mould release agent, an aerator blanket is extended along the layer with adhesive properties, with dimensions larger than said layer with adhesive properties, and next a resilient membrane is extended on the entire tool surface, such that this membrane includes a vacuum valve for extracting the air comprised between the membrane and the tool and the layer with adhesive properties is compacted, maintaining the vacuum during the time required for performing the compaction of said layer with adhesive properties. These characteristics are possible due to the fact that the membrane carries out the closing down just about the aerator blanket when applying vacuum by its resilient properties, which avoids the use of the vacuum putty.

Accordingly, by means of the invention, the compaction process is simplified besides avoiding the generation of residue materials, as well as the logistic costs originated for transporting materials, for both their new utilization and their subsequent recycling. The compaction method of the invention comprises a later stage wherein the removal of the membrane and the aerator blanket is performed, such that next, the patterns of the composite materials are positioned in areas where the skin piece to be obtained needs higher rigidity. Next, a layer with conductive properties (8), which can be a pattern layer, a pre-impregnated layer, a pre-impregnated pattern layer, or a pre-impregnated mesh-shaped layer is mounted. In the case that a mesh-shaped layer is mounted, one of its faces is protected by a protective paper, which is mounted on the surface of the compacted layer with adhesive properties, leaving the protective paper arranged on the face opposite to the tool, being the mesh protruding at a surplus part with respect to the double sided tape outline.

For the case wherein a pre-impregnated mesh-shaped layer with conductive properties with protective paper on one of its faces is required to position, in a later stage, a double sided tape with protective plastic is placed at the entire outline defining the piece to be obtained, overlapping it with the layer with adhesive properties, such that the double sided tape does not stay within the outline of the piece to be obtained. The overlapping of the double sided tape with the layer with adhesive properties is carried out between 2 and 5 mm.

Next the aerator blanket is extended again and the protective plastic of the double sided tape is removed, in order to extend next the membrane and carry out a second compaction extracting the air comprised between the membrane and the tool, such that the compaction is maintained until the adhesion of the mesh to the layer with adhesive properties, to the patterns of composite materials and to the double sided tape is produced.

Next the membrane and the aerator blanket are removed and the protective paper is detached from the mesh, such that next the surplus mesh is cut away according to the double sided tape outline and with the help of said double sided tape outline.

In order to achieve this functionality of the cut, it is envisaged that this is carried out in the widest area of one of the ends of the surplus and leveled with the double sided tape outline, in order to next pulling out the cut away surplus in the direction of the tape outline, such that the cut is carried out in the same direction that said double sided tape outline, the mesh-shaped layer with conductive properties being adhered to the double sided tape, thus being leveled with the tape outline. Accordingly, the method of the invention substantially simplifies the cut, since it is guided by the double sided tape outline and the use of a tool or templates for performing the cut is not required, but the double sided tape outline enables the cutting and the guidance of the mesh surplus, by simply pulling out thereof after performing a small cut.

Once the cut has been performed, some sheets rigidizing certain areas are positioned on the conductive mesh at those points wherein subsequently, in the piece to be obtained, other operations such as, for example, riveting should be applied, and next said sheets are covered with a new layer with adhesive properties with similar dimensions. Next, the aerator blanket and the membrane are extended for compacting again, extracting the air comprised between the membrane and the tool. If the stacking of subsequent layers is produced manually, the membrane is removed after about 10 minutes of compaction as well as the aerator blanket, and the taping process is started. Since said process has several compactions, the steps wherein the aerator blanket and the membrane are placed for subsequently applying vacuum and compacting the later layers are repeated, as well as removing the membrane and the aerator blanket after about 10 minutes of compaction. If the taping process is produced in an automatic machine, the tool keeps compacting until the automatic stacking in its corresponding machine is carried out. Said taping of layers will result in the skin constituting the base piece of the coating.

The removal stages of the membrane are carried out by rolling it up in a cylindrical tubular body, in such a way that the removal of the resilient sheet is facilitated, as well as its subsequent location for performing a new compaction.

Thus, by means of the new compaction process of the invention, stages in the realization of the same are avoided, while the production of waste materials is avoided thus reducing the costs and the run time of the compaction process.

Next, in order to facilitate a better understanding of this specification, and being an integral part thereof, a series of figures in which the object of the invention has been represented in an illustrative and not limitative manner is attached.

DESCRIPTION OF THE PREFERRED EMBODIMENT

Next, a description of the invention is made based on the aforementioned figures.

Figure 1:
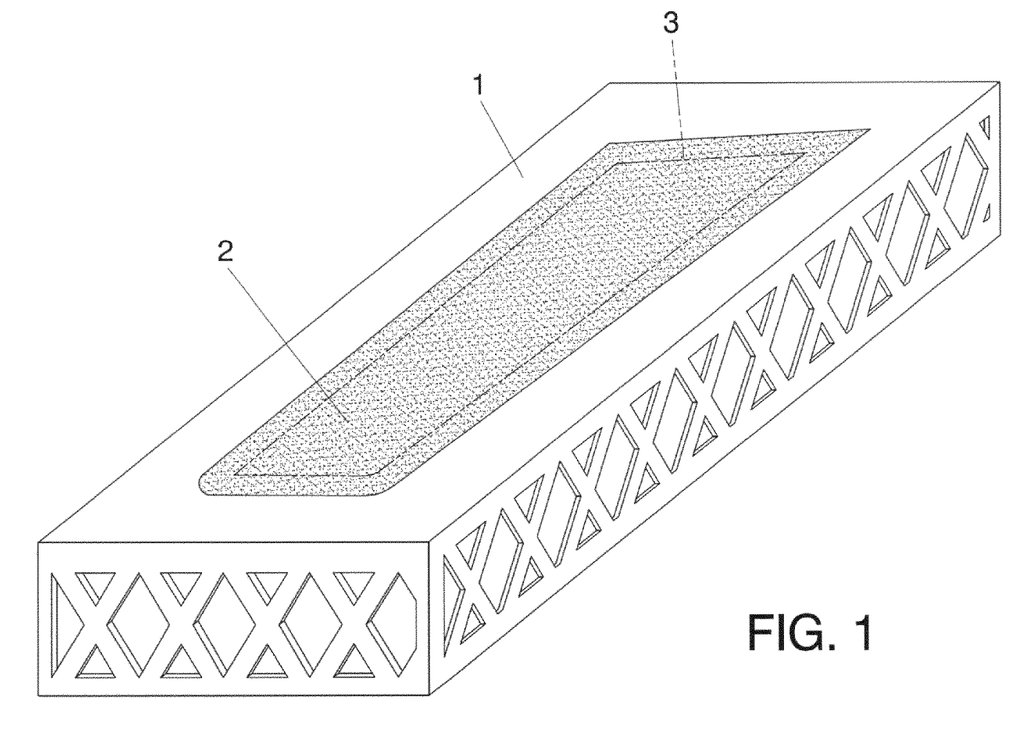
FIG. 1.—Shows a schematic perspective view of a tool, wherein a layer with adhesive properties with dimensions larger than the coating piece to be obtained has been applied after the application of the mould release agent.

Before carrying out the taping for obtaining a coating piece either manually or automatically, such as for example, can be one of the pieces constituting the coating of an aircraft, a mould release agent is applied on the tool 1 surface. The most used mould release agents are Frekote 33, Reléase All 75, Ram 225, water-based, etc. The application of the mould release agent is carried out homogeneously, uniformly, and according to the following instructions:

when dealing with a tool 1 without a prior mould release agent, at least three layers are applied, having to leave a drying time between them. Next, the mould release agent 30 is cured for 30 minutes at 120° C.

if the tool 1 has been used in other occasions, curing the mould release agent is not necessary when applying a new mould release agent layer over the other one already cured and for certain mould release agents, since it can be carried out at room temperature.

Because almost all of the mould release agents excepting water-based mould release agents contain volatile and inflammable solvents in their formulation, it is convenient that the application area is ventilated and free of fire hazard.

Once the mould release agent has been cured, the tool 1 is rubbed with a clean cloth, until eliminating the possible roughness and the opaque appearance thereof.

Once the tool 1 is clean, a layer with adhesive properties 2 is applied. The layer 2 is applied on a surface exceeding the limits of the coating skin piece 3, which has been represented by means of a dot-and-dash imaginary line. Thus, before applying the layer 2 the outline to be adopted by the final coating piece should be known.

This layer 2 has the function of refilling the pores that may persist on the uncovered side of the piece and thus leaving a completely smooth surface.

Figure 2:
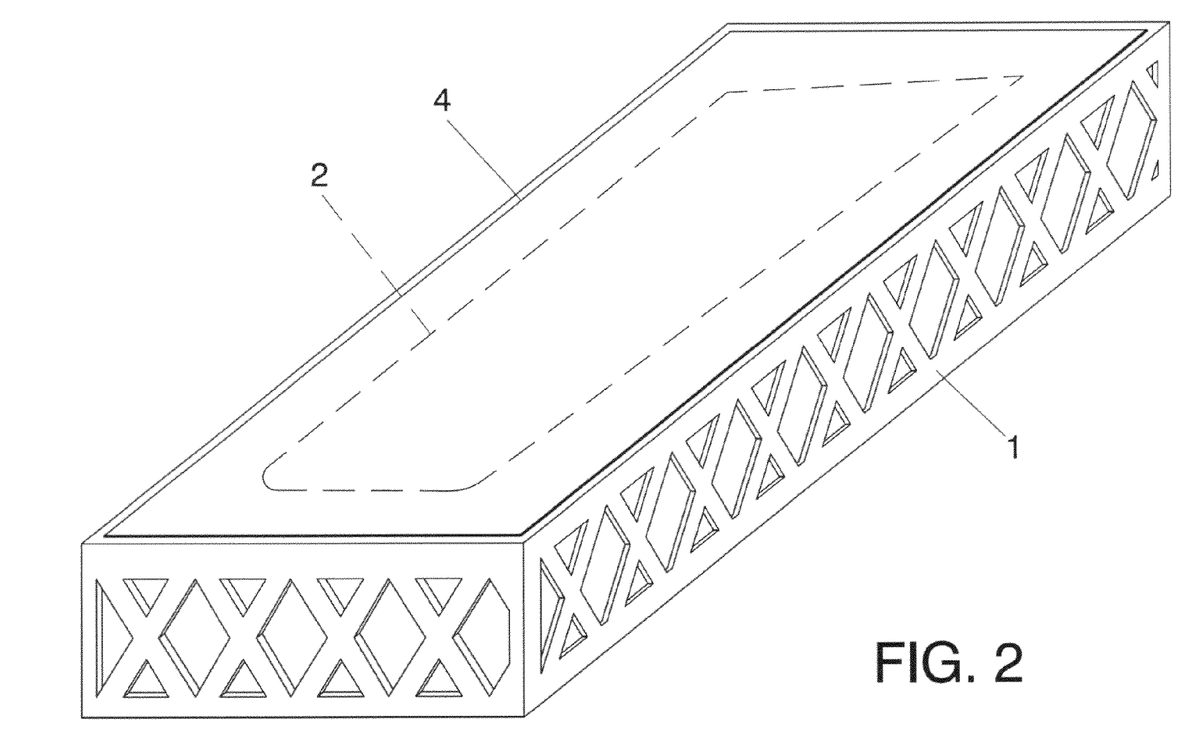
FIG. 2.—Shows a view equivalent to the previous figure wherein the aerator blanket has been arranged.

In addition, for the layer 2 to be completely adhered to the tool 1, a first compaction is carried out, wherefore an aerator blanket 4 formed by a separating film and an aerator fabric is extended along the tool. The blanket 4 has the function of allowing the vacuum to equally circulate at all points of the tool 1, and must have dimensions larger than the compaction area, in this case the one constituted by the previous layer 2.

Figure 3:
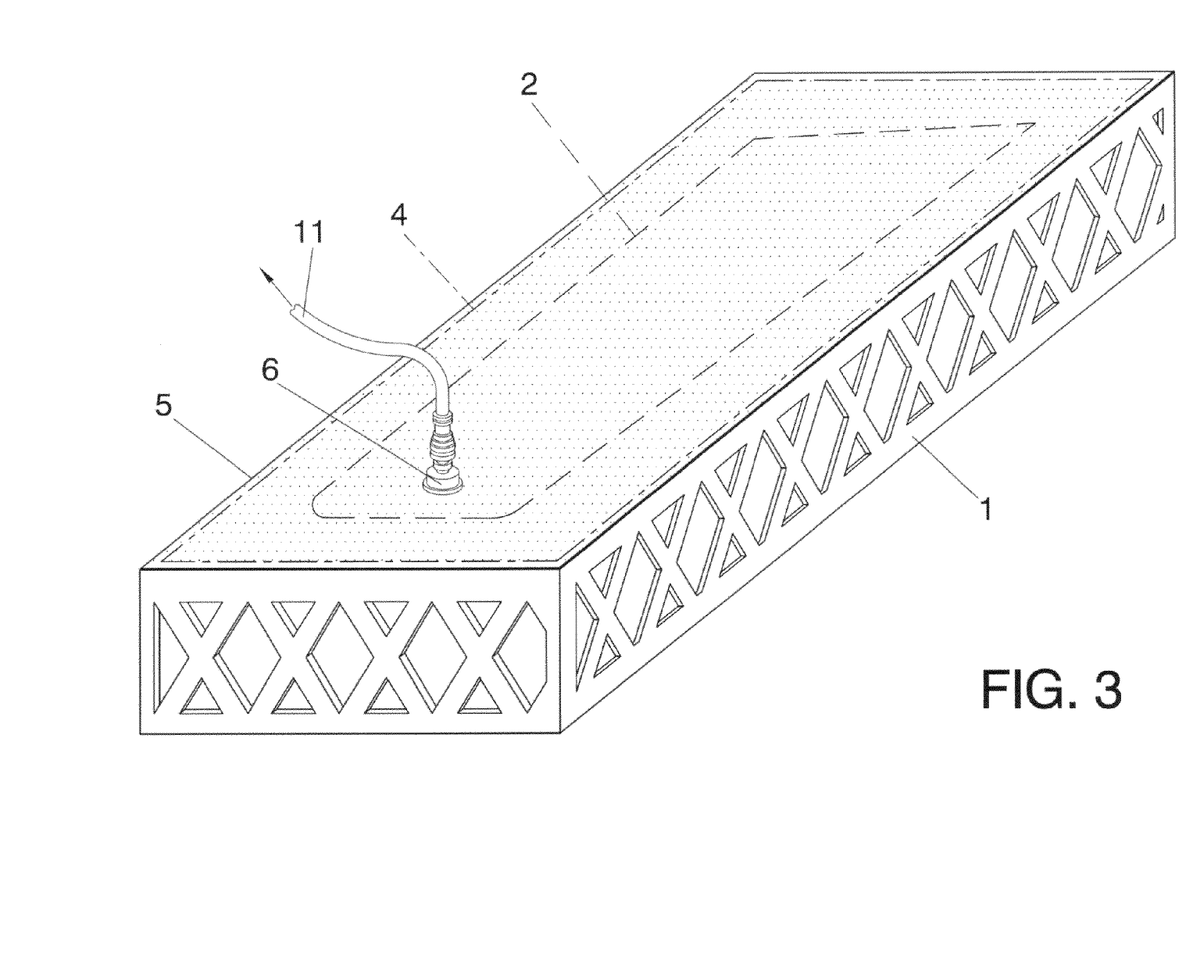
FIG. 3.—Shows a view equivalent to the previous figure wherein vacuum is applied for performing the compaction of the layer with adhesive properties by means of the incorporation of the membrane on the aerator blanket.

Next, a membrane with resilient properties 5 is extended on the entire surface of the tool 1, which is connected, by means of a vacuum valve 6, to a vacuum rubber 11 which in turn is connected to a compressor (not represented), such that next the air is extracted from the interior of the membrane 5, comprised between this and the tool 1, and the layer 2 and the aerator blanket 4 previously mounted are compacted. In order to attain an optimum vacuum, it has to be ensured that there are no folds on the membrane 5 and no element protruding from the interior of the tool 1.

Vacuum is applied for about 10 minutes at −600 mm/Hg, in order to attain the correct compaction of the layer 2.

Next, the membrane 5 is rolled up in a cardboard small tube 12 for its subsequent storage and the aerator blanket 4 is removed by folding it and leaving it in a clean place. Next, some patterns of composite materials (not showed) are positioned, which are mounted on the areas where it is required due to mechanical and/or designing needs, such as for example, on the assembly areas with the adjacent coating pieces.

Figure 4:
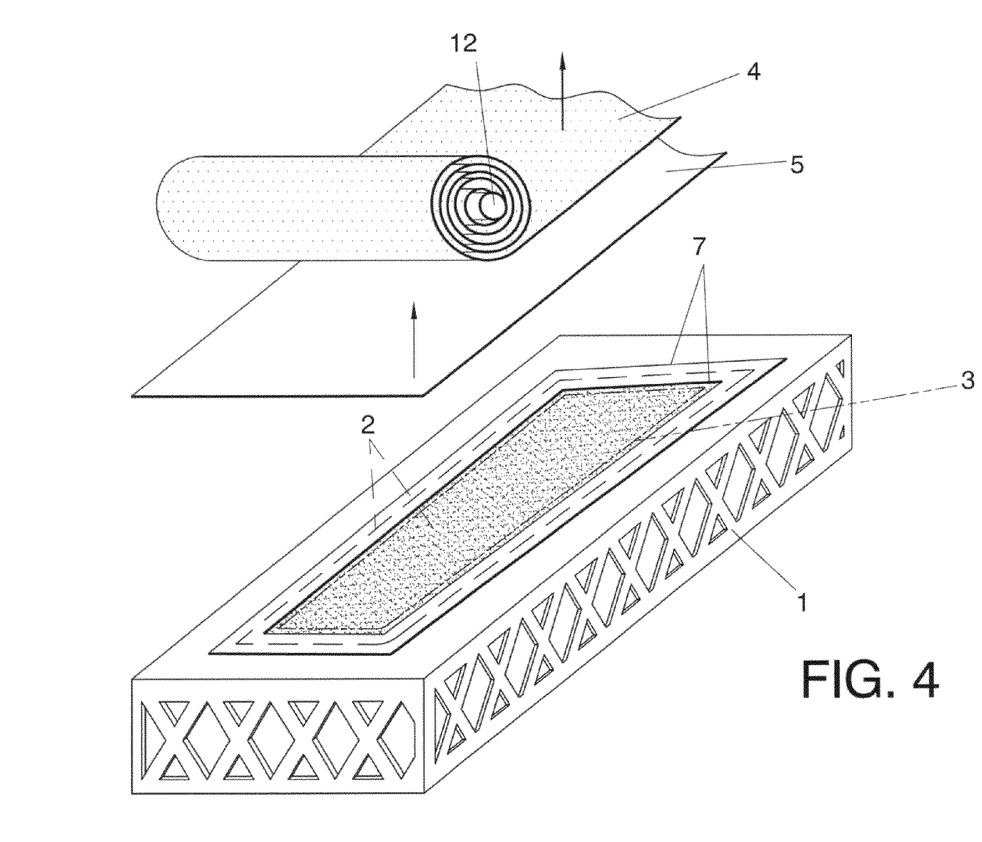
FIG. 4.—Shows the stage wherein a double sided tape overlapped with the compacted layer with adhesive properties is arranged, after removing the aerator blanket and membrane.

The process continues by placing a double sided tape 7 on the entire outline of the layer 2, overlapping therewith between 2 and 5 mm. The double sided tape 7 must never stay within the outline 3 constituting the coating skin piece.

Figure 5:
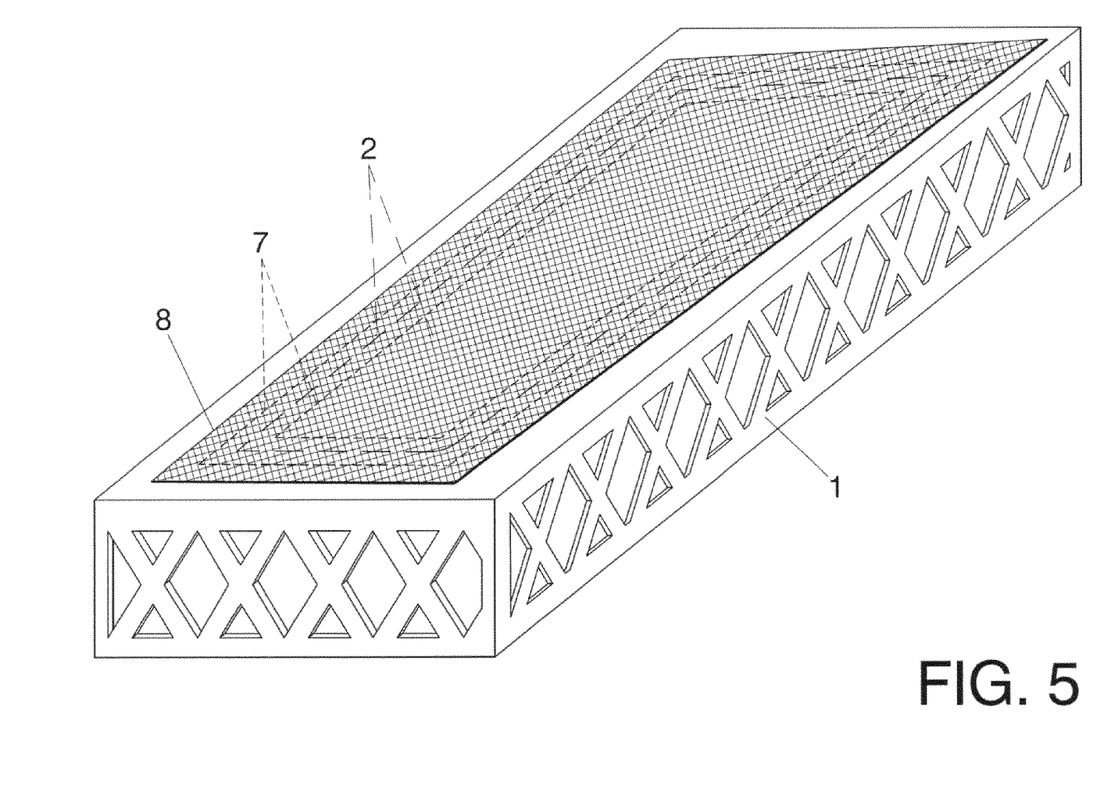
FIG. 5.—Shows the stage wherein the mesh-shaped layer with conductive properties is arranged.

Next a layer with conductive properties 8 is mounted, for example in the form of a mesh with dimensions exceeding the double sided tape outline 7, leaving the protective paper 9 of the mesh 8 on the face opposite to the tool 1.

Figure 6:
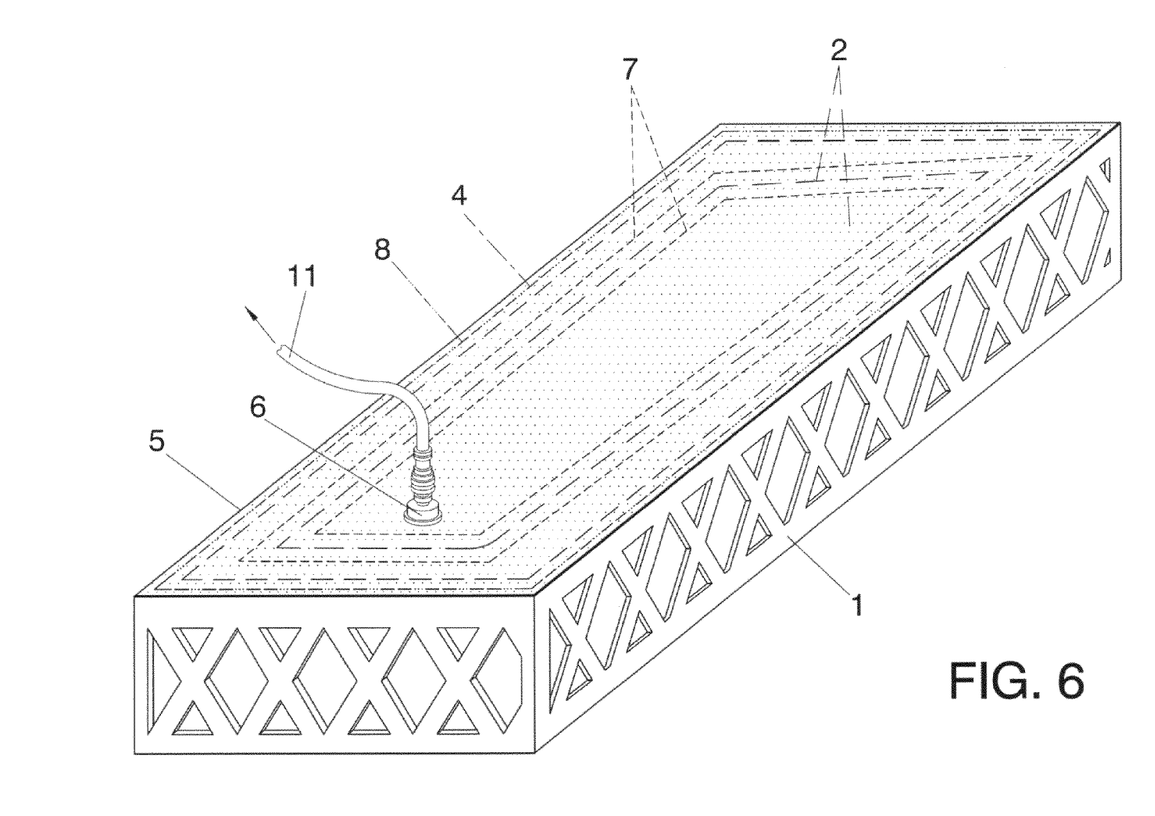
FIG. 6.—Shows the stage wherein the mesh compaction is performed.

The aerator blanket 4 is extended again and the protective plastic of the double sided tape 7 is removed in order to now extend again the membrane with resilient properties 5 by unrolling it from the cardboard small tube 12 and the vacuum valve 6 is connected to the compressor by means of the hose 11. Just like the previous case for attaining an optimum vacuum, it has to be ensured that there are no folds on the membrane 5 and no element is protruding from the interior of the tool 1.

Figure 7:
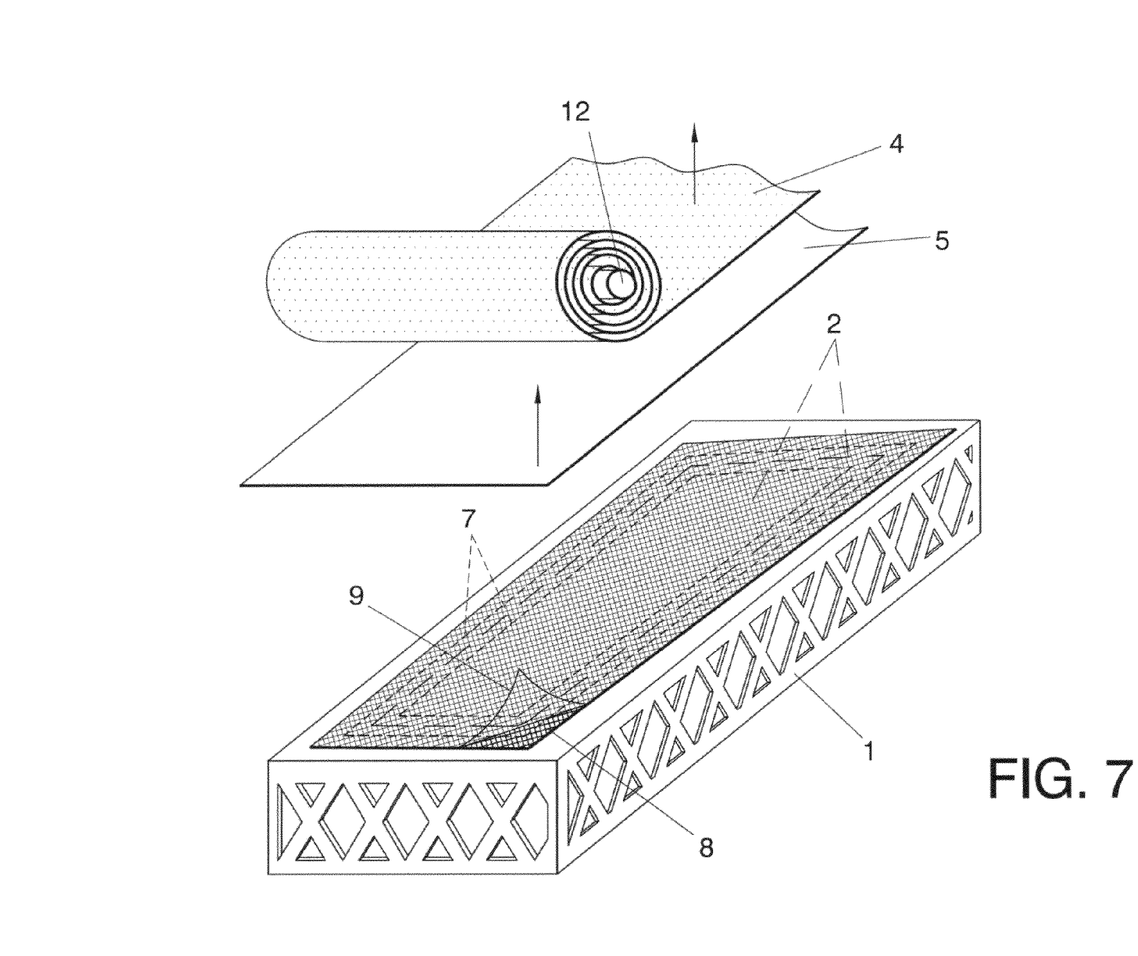
FIG. 7.—Shows the stage wherein the mesh compaction is carried out and the paper sheet coating it is removed.

The compaction is applied on the mesh 8 for about 10 minutes at −600 mm/Hg and then the membrane 5 is rolled up again in the cardboard small tube 12 for its subsequent storage and the aerator blanket 4 is removed.

Figure 8:
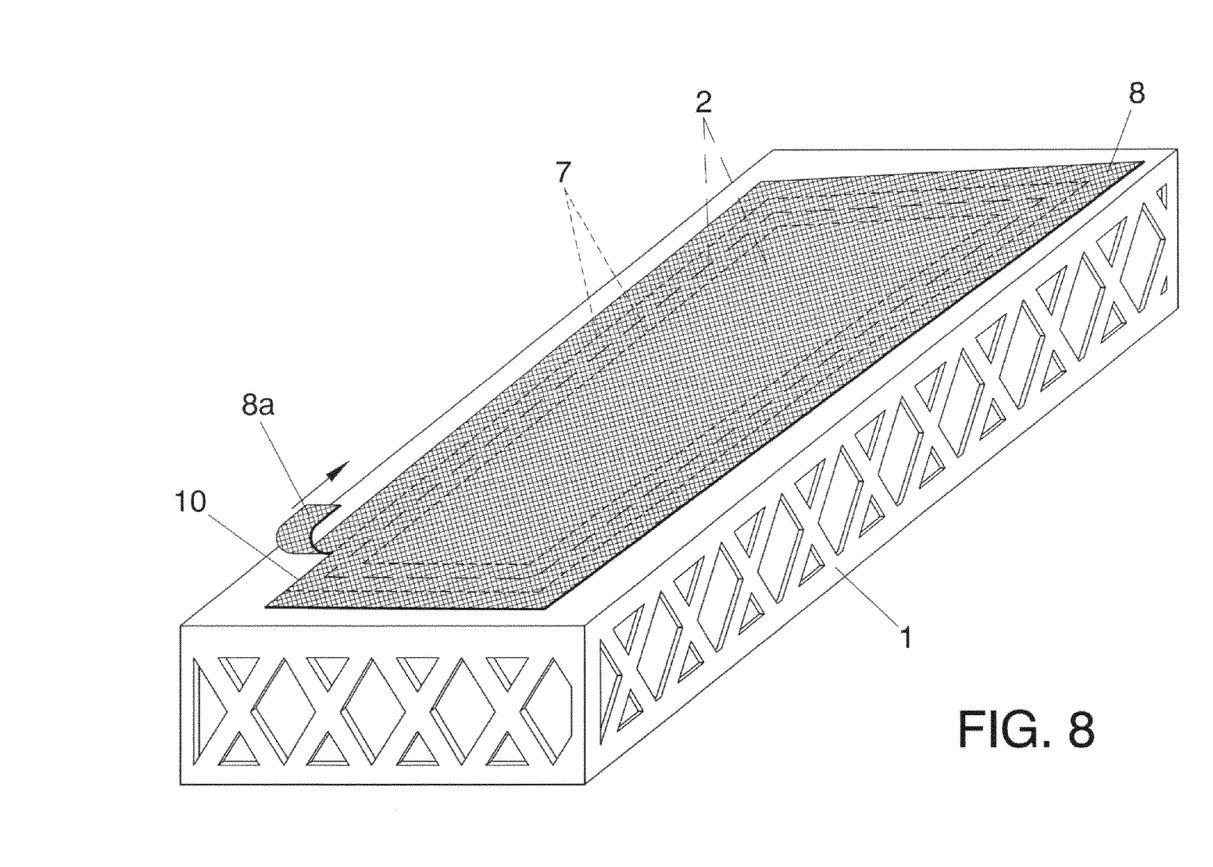
FIG. 8.—Shows a view wherein the cutting of the compacted mesh surplus is started.
Figure 9:
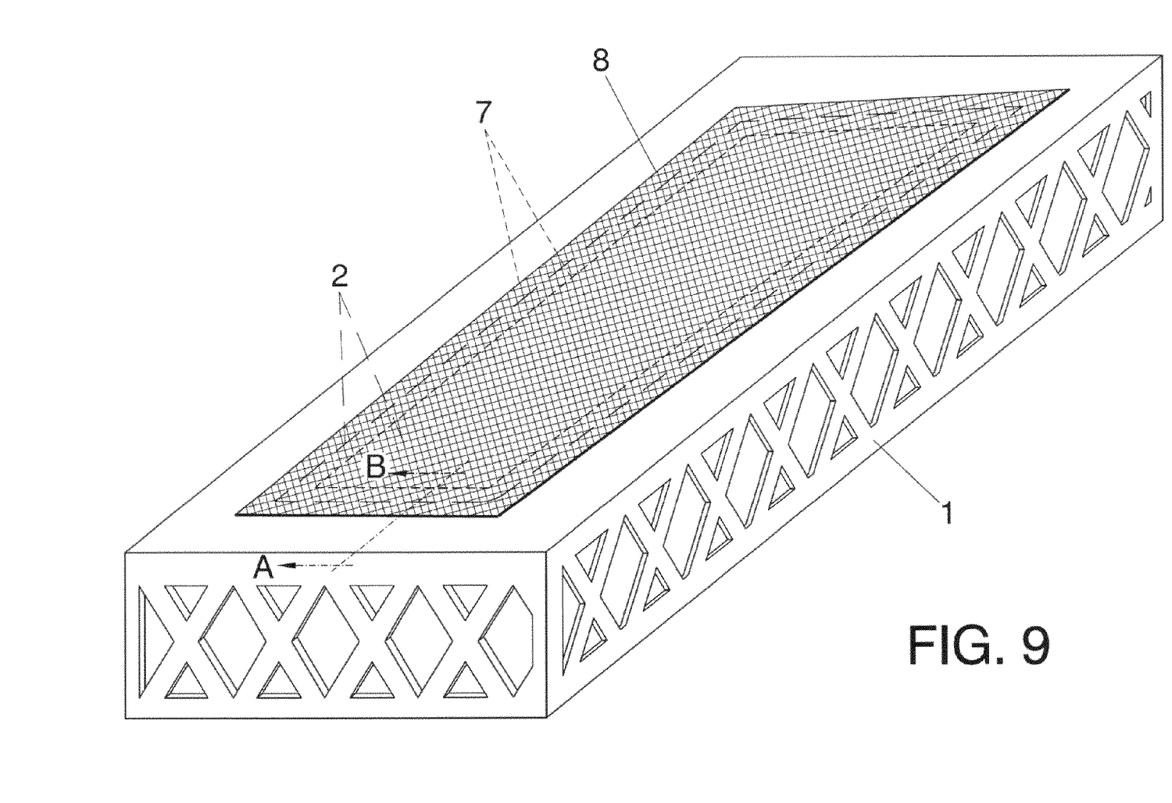
FIG. 9.—Shows a view wherein the complete cut of the mesh surplus, according to the double sided tape outline, has been performed.
Figure 10:
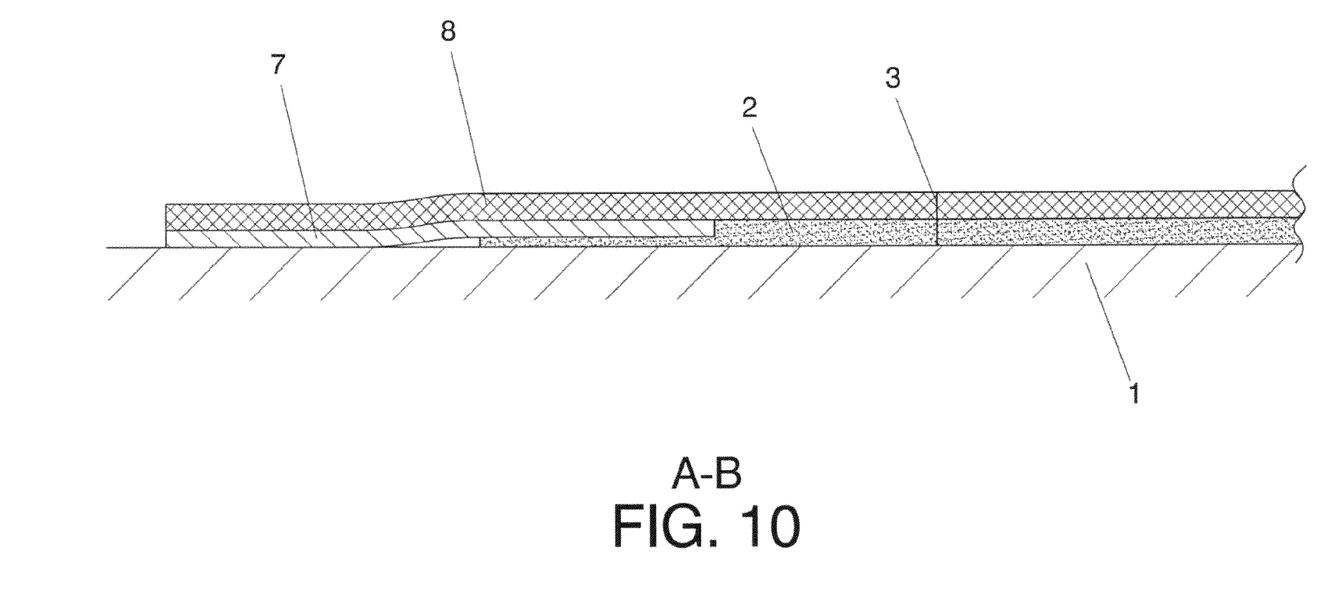
FIG. 10.—Shows a view according to section A-B of the previous figure.

In the compaction process, the perfect adhesion of the mesh 8 on the double sided tape 7 and on the layer 2 has been produced; such that now the surplus of the mesh 8 exceeding the double sided tape outline 7 should be cut, if appropriate. For that purpose, a cut 10 on one of the ends of the surplus is carried out, always in the widest area, and leveled with the double sided tape outline 7, which allows that if the surplus is pulled out in the same direction as the double sided tape 7 causes that, as the mesh 8 is attached and compacted to the double sided tape 7, when the surplus is pulled out, the double sided tape 7 itself acts as cutter leaving the mesh 8 leveled with the tape 7.

Next, some sheets rigidizing certain skin areas are positioned, their situation normally matching the assembly of elements such as the piece assembling a coating piece with another one, through coupling elements, and finally said sheets are covered with a new layer with adhesive properties with similar dimensions.

To conclude, the aerator blanket 4 is placed again and the membrane 5 is placed again, applying the vacuum that enables the compaction of the described last layers.

When the skin is manually laminated, the membrane 5 is rolled up, for example in a cardboard small tube and the aerator blanket 4 is removed in order to laminate by hand the layers constituting the skin laminate. Once finished, the aerator blanket 4 is extended again as well as the membrane 5, applying the vacuum that enables the compaction of the last stacked layers. Since hand skin manufacturing requires more compactions between layers, the aforementioned steps are repeated. However, if the skin laminate is stacked in an automatic machine, the tool 1 is maintained connected continuously to the vacuum network until coming into said machine, which tapes over the previously compacted layers a laminate constituting the coating skin, which will be subsequently beveled.

The invention claimed is:

1. A compaction process for manufacturing a compacted piece of composite materials, comprising: applying a mould release agent on a coating piece manufacturing tool and carrying out its curing; applying a layer with adhesive properties on the mould release agent, to achieve a smooth surface on the compacted piece, extending an aerator blanket along the layer with adhesive properties, the aerator blanket being larger than said layer with adhesive properties; extending a membrane with resilient properties on the entire surface of the tool, avoiding leaving folds and also avoiding protrusion of the blanket; the membrane with resilient properties including a vacuum valve in order to extract air present between the membrane with resilient properties and the tool, and compacting the layer with adhesive properties by keeping a vacuum condition for a certain time; removing the membrane with resilient properties and the aerator blanket; positioning patterns of composite materials on rigid areas of the compacted layer with adhesive properties; placing a double sided tape with protective plastic on an entire outline defining the compacted piece and overlapping the tape with the compacted layer with adhesive properties, but in such a way that it does not stay within the outline of the compacted piece; mounting a layer with conductive properties, selected from a pattern layer, an impregnated layer, a pre-impregnated pattern layer, and a pre-impregnated mesh-shaped layer with conductive properties, one of the faces thereof being protected by a protective paper, onto the surface of the compacted layer with adhesive properties, leaving the protective paper arranged on the face opposite to the tool, a surplus part of the layer with conductive properties protruding with respect to the double sided tape outline; extending the aerator blanket and removing the protective plastic of the double sided tape; extending the membrane with resilient properties in order to carry out a second compaction by extracting the air present between the membrane with resilient properties and the tool, and adhering the layer with conductive properties to the layer with adhesive properties, to patterns of composite materials, and to the double sided tape; removing the membrane with resilient properties and the aerator blanket, detaching the protective paper from the layer with conductive properties and cutting away the surplus part of the layer with conductive properties according to the double sided tape outline and with the help of said double sided tape outline.

2. The compaction process according to claim 1, further comprising: positioning some rigidizing sheets on the layer with conductive properties on the areas wherein the piece to be obtained requires higher rigidity, said rigidizing sheets being then covered with a new layer with adhesive properties with similar dimensions relative to the rigidizing sheets; extending the aerator blanket and the membrane with resilient properties to compact the piece again, by extracting the air present between the membrane with resilient properties and the tool; carrying out a taping, selected from a manual taping and an automatic taping, which laminates over the previously compacted layers to obtain a laminated piece known as coating piece skin.

3. The compaction process matcrials, according to claim 1 or 2, wherein, each stage of removing the membrane with resilient properties is carried out by rolling it up in a cylindrical tubular body.

4. The compaction process according to claim 1, wherein the overlapping of the double sided tape with the layer with adhesive properties is between 2 and 5 mm long.

5. The compaction process according to claim 1, wherein the cutting of the layer with conductive properties is carried out according to the following stages: making a cut at the widest area of one of the surplus parts of the layer and leveled with the double sided tape outline; pulling out the cut surplus parts of the layer in the direction of the double sided tape outline, for the cut to be carried out in the same direction that said double sided tape outline, being adhered to the double sided tape, the layer with conductive properties being even with said double sided tape.

6. The compaction process according to claim 1, wherein said membrane with resilient properties is extended to provide the vacuum condition between the membrane with resilient properties and the tool without providing any vacuum paste.

7. A compaction process for manufacturing a compacted piece of composite materials, comprising: applying a mould release agent on a coating piece manufacturing tool and carrying out its curing; applying a layer with adhesive properties on the mould release agent, to achieve a smooth surface on the compacted piece, extending an aerator blanket along the layer with adhesive properties, the aerator blanket being larger than said layer with adhesive properties; extending a membrane with resilient properties on the entire surface of the tool, avoiding leaving folds and also avoiding protrusion of the blanket; the membrane with resilient properties including a vacuum valve to extract the air present between the membrane with resilient properties and the tool, and compacting the layer with adhesive properties by keeping the vacuum condition for certain time; removing the membrane with resilient properties and the aerator blanket; taping down with a tape the compacted layer with adhesive properties to define a compacted piece along its entire outline for a subsequent compaction step, mounting a layer with conductive properties with a layer of protective paper disposed on its upper surface onto the compacted layer with adhesive properties, such that an excess perimeter of the layer with conductive properties extends beyond the outline of the tape, extending the aerator blanket and membrane with resilient properties to carry out a second compaction step and adhere the layer with conductive properties to the layer with adhesive properties and the tape, and cutting away the excess perimeter of the layer with conductive properties using said tape as a guide after the second compaction step is carried out.

* * * * *